Figure 1:
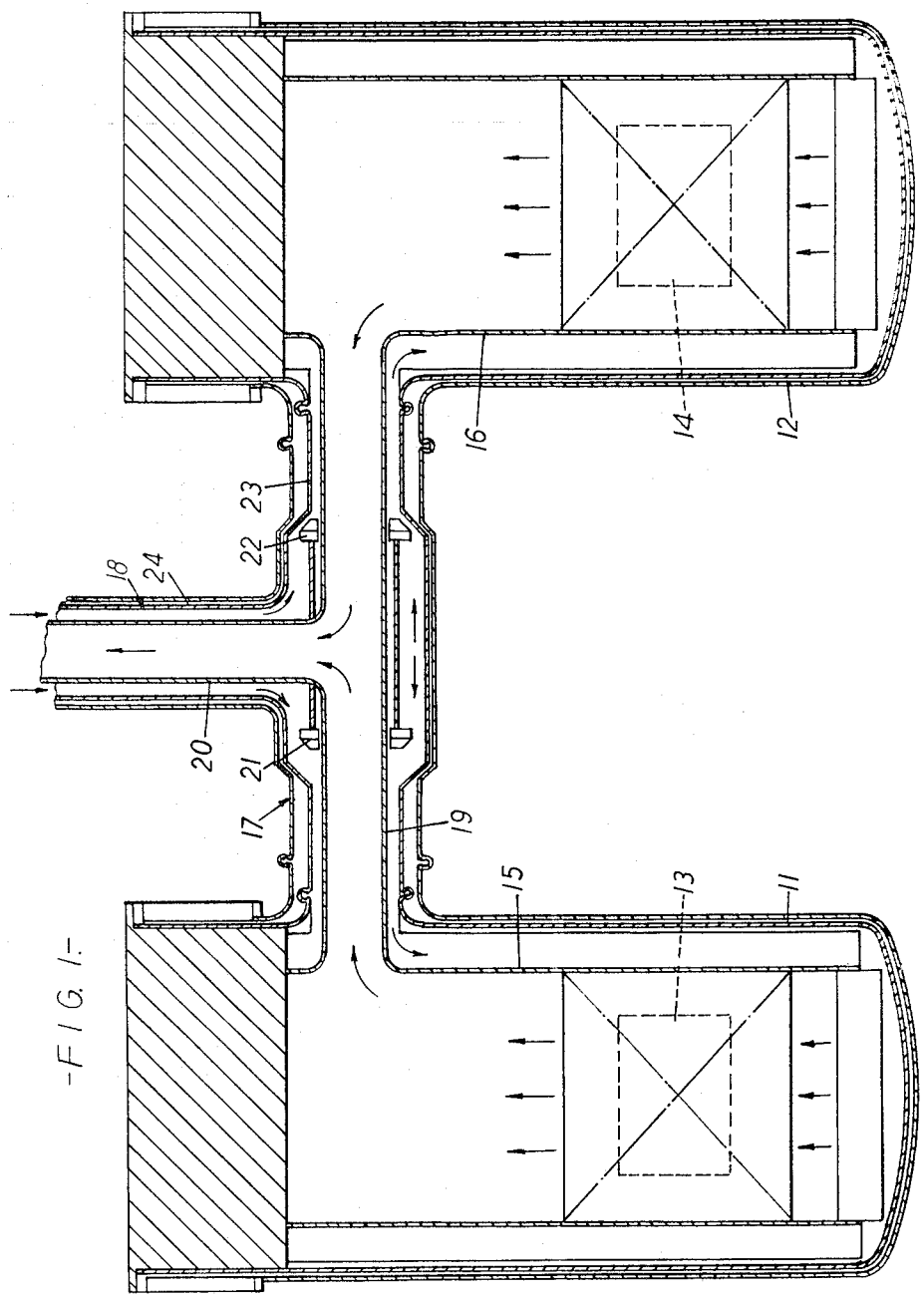

Dec. 20, 1966 W. G. HUTCHINSON ETAL 3,293,137
POWER GENERATION FROM NUCLEAR REACTOR PLANT
Filed May 18, 1964 2 Sheets-Sheet 1

United States Patent Office 3,293,137
Patented Dec. 20, 1966

3,293,137
POWER GENERATION FROM NUCLEAR REACTOR PLANT
William George Hutchinson, Lymm, and John Webb, Wigan, England, assignors to United Kingdom Atomic Energy Authority, London, England
Filed May 18, 1964, Ser. No. 368,237
Claims priority, application Great Britain, May 28, 1963, 21,360/63
4 Claims. (Cl. 176—32)

The present invention relates to the generation of useful power, as electricity for instance, from heterogeneous nuclear reactor plant. In this context the qualification heterogeneous implies the use of fuel elements which are assembled within a reactor core vessel into a potentially critical configuration and are cooled by the flow of a coolant over them.

In such plant the fuel elements have to be replaced as the irradiation limit is reached. Discharging and recharging for this purpose is more simply carried out if the reactor is shut down, that is to say, rendered sub-critical. Even so, there is still the difficulty that the elements will continue to generate heat due to the decay of radioactive fission products. This difficulty is in proportion to the operational heat rating of the reactor fuel and therefore presents a particular problem in the case of so-called fast reactors in which a high rating is usual. In general, it can be said that simplicity in the refuelling operation is achieved at the expense of load factor, that is to say the proportion of the plant life actually used for the delivery of power, and is likely nevertheless to be encumbered by measures necessary for dealing with the decay heat.

According to one aspect of the present invention we provide in the generation of useful power, as electricity for instance, from heterogeneous nuclear reactor plant a method which comprises maintaining a condition of nuclear criticality in one assembled charge of fuel elements, maintaining concurrently a sub-critical condition in another assembled charge, distributing coolant flow from a common source in proportions sufficient for the maximum fuel element surface temperature not to exceed a given magnitude in both charges, and subsequently reversing the respective conditions of the charges, whilst at the same time adjusting the coolant flow distribution correspondingly, so as to enable the fuel elements of the previously critical charge to decay undisturbed until such time as discharge is desired.

Preferably a cycle is established by the further steps of dismantling the previously critical charge, if necessary after a period to allow for reduction of decay heating, and assembling in its place a renewed charge of fresh fuel elements in readiness for the next changeover. During a period to allow for reduction of decay heating, as also during dismantling if cooling is still required, the proportion of the coolant flow distributed to the decaying charge can be decreased progressively, the preferred objective being to maintain in the decaying charge coolant stream an outlet temperature equal to, or at least suitable for combination with, the outlet from the critical charge.

The time taken for the critical charge to reach the irradiation limit is ample for the decay, dismantling and renewal of the other charge. There is no restriction of choice on the handling of it and the main consideration, at least from the economic point of view, becomes that of the financial investment represented by the fuel inventory.

A heterogeneous nuclear reactor plant for practicing the invention basically may comprise a plurality of reactor core containers each adapted to contain a charge of fuel elements assembled for criticality, a common coolant supply means, and distribution means for varying the distribution to such containers, and hence to respective fuel element charges therein, of the coolant supplied by the supply means.

By maximum utilisation of the common equipment principle, for instance in respect of such items as electricity generating machinery and, in the case of indirect cycle plant, the heat exchangers, the only major duplication lies in the provision of more than one core container. It is implied of course that each such container is furnished appropriately for establishing criticality in the charge installed therein and for directing coolant flow over the fuel elements. For operation in the manner of a fast reactor, where there is no significant moderation, the individual containers can be small and without elaborate fittings. Bearing in mind that a single-core fast reactor customarily makes provision for the storage of decaying fuel elements in the neighbourhood of the core and so demands for this reason, if no other, that the containing vessel is very considerably larger than the core itself, the expense of providing two core containers, which can each be tailored for the requirements of the core alone, may well be less.

The core containers may be separate vessels or they may be compartments of a single vessel. By way of illustration of the latter alternative a single cylindrical vessel may be disposed with its axis horizontal to receive one to either side of a central partition two cores assembled from elongated fuel elements lying horizontally.

The feature common in liquid metal-cooled fast reactors of having the coolant circuit open to a reservoir of the coolant providing extra thermal capacity can be incorporated, for example by arranging the heat exchangers necessary in this case in one or more reservoir tanks. In the tank, or each such tank, there is also a pump which serves for coolant supply and draws coolant for delivery to the core containers from the reservoir into which the heat exchangers discharge.

For control of the distribution of coolant to the core containers, it is convenient to provide in each of the branches of the coolant delivery line leading to the respective core containers a flow control valve which is steplessly variable. The valves thus provided may be coupled for common control.

Examples facilitating practice of the invention are shown diagrammatically in the two figures of the accompanying drawings. That of FIG. 1 shows two separate tank vessels 11, 12 each adapted to receive a charge of elongated fuel elements which are assembled together with vertical orientation to constitute a core 13 or 14, as the case may be, capable of sustaining a chain reaction by fast fission, that is to say, with neutrons having an energy spectrum of which the average exceeds 1 kev. The core region in each case is bounded by a cylindrical baffle 15 or 16 which terminates short of the respective tank bottom and leaves between itself and the inner wall of the tank vessel an annular space so that through this space a liquid metal coolant, such as sodium, may be conducted for upward flow through the core.

Interconnecting the two tank vessels is a length of coaxial ducting 17 having a central section constructed as a combined valve casing and T junction with another length of coaxial ducting 18. The ends of the inner duct 19 of the ducting 17 open respectively into the interiors of the cylindrical baffles 15, 16 so that hot coolant leaving the cores is directed to the inner duct 20 of the ducting 18 for passage to one or more heat exchangers (not shown). Variable restrictor valves 21 and 22 are operative in the outer duct 23 of the ducting 17, one to either side of the T junction, to control the distribution to the two cores of coolant being delivered from pumps (also not shown) through the outer duct 24 of the ducting 18, the two valves being coupled for common operation.

As illustrated, the restrictor valve 22 is positioned to allow only a minor portion of the pump delivery to take the path to the core 14 and therefore this core is to be taken as the one which is sub-critical; furthermore, it will be one which has already been in service and is presently dissipating decay heat, the amount of coolant passed to it being set by the adjustment of the valve 22 to ensure that the surface temperature of the component fuel elements does not exceed a given magnitude. When decay heating is sufficiently reduced for convenient handling of the fuel elements, the progressive closure of the valve 22, which has accompanied the decay process, is completed so as to stop altogether the flow of coolant from the pump to the core 14. Thereupon, this core can be discharged and renewed by access through the top of the tank vessel.

Figure 2:
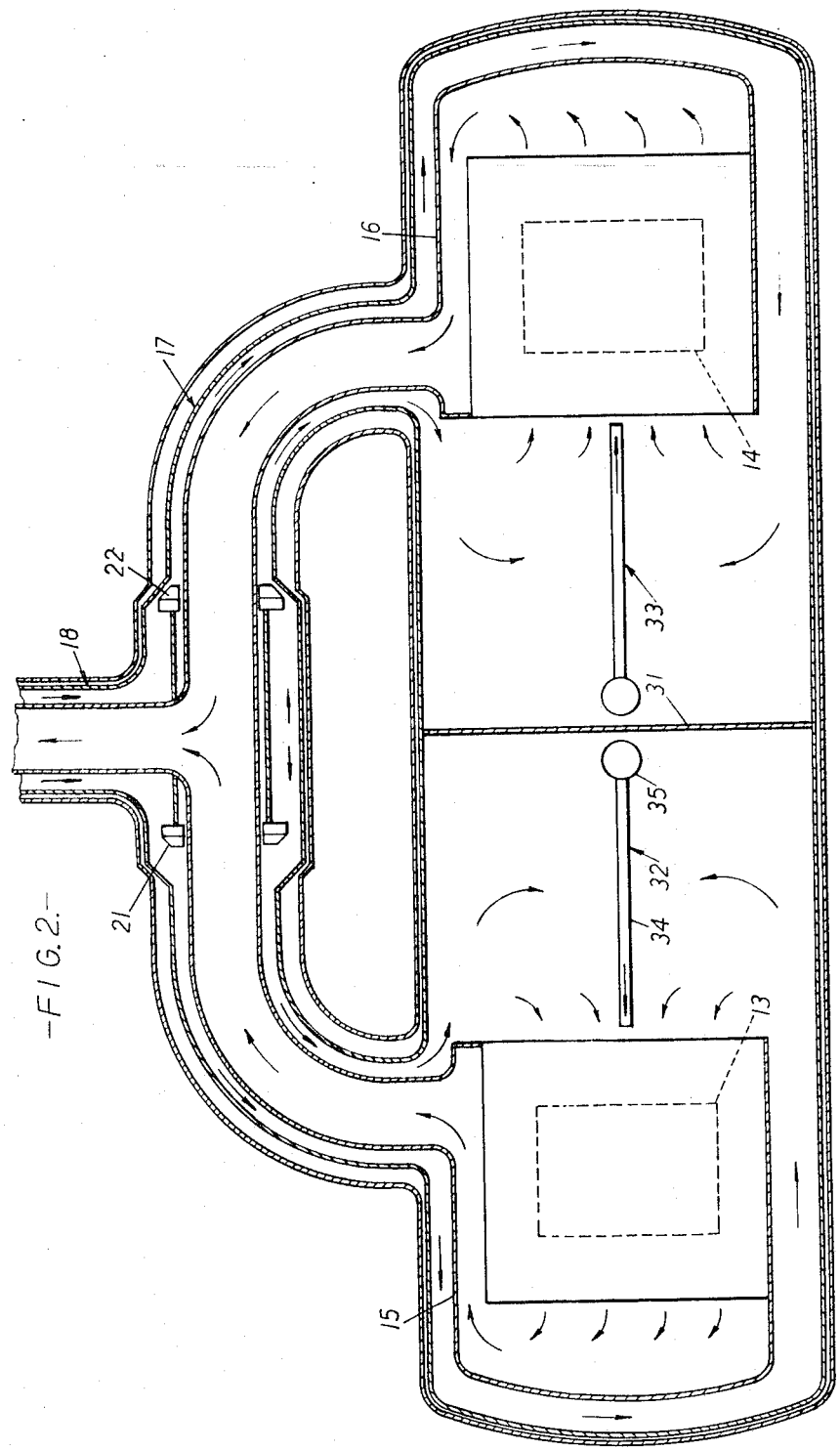

In the example of FIG. 2, a single horizontally disposed vessel 30 of cylindrical shape is divided by a central wall 31 into two compartments wherein the two cores 13 and 14, in this case with their component fuel elements orientated horizontally, are disposed respectively in an end to end relationship. The structure defining the coolant flow paths, that is to say, the baffles 15, 16, the co-axial ducting 17, 18 and the restrictor valves 21, 22, is so arranged in this case that the flow through the cores is in the direction from the central wall 31 towards the respective vessel end. In this direction the fuel elements bear against fixed structure in the manner of a grid for resisting the thrust exerted on the elements by the coolant flow.

The view as seen in FIG. 2 is in plan and therefore penetrations of the vessel wall for core access, which are made in the top of the vessel so as to be above the free surface of the liquid coolant, are not visible. Such penetrations are provided for control members capable of entry into the cores perpendicular of the fuel element orientation. Thus, the top face of each core is available for control purposes, the end face adjacent the vessel end for instrumentation, and the other end adjacent the central wall for the handling of fuel elements. Handling of the fuel elements may be carried out with the aid of the apparatus indicated 32 or 33, as the case may be, which is constructed on the principles of remotely operable manipulators. Reference numeral 34 indicates a fuel element receptacle which for indexing with the fuel element positions in the core is carried by a vertical arm 35 mounted in the vessel top wall in a manner allowing two modes of movement, namely, sliding into and out of the vessel and rocking transversely of the vessel axis. Included in the apparatus there will be a grab by which a fuel element can be drawn into the receptacle from its position in the core. From or in the receptacle the withdrawn element can be up-ended for removal from the vessel through the penetration for the arm 35.

The sub-critical condition of the inactive core, i.e. core 14 in the above examples, is maintained by such means as are available for shut down, notably control members of neutron absorber inserted, as in the form of rods or blades, into the charge. The alternative of achieving this condition by displacement of certain of the fuel elements to produce a sub-critical re-arrangement of the assembly within the respective container is also within the scope of the invention but is considered less convenient because of the need of special attachments for the displaceable elements. Such control of the criticality is applicable whether the charge is a decaying one or the replacement therefor. So far as concerns getting the fuel elements into and out of the respective container the charge could be handled as a single unit or package, such handling being possible due to the extended period of decay which can be allowed by means of the invention without detriment to the load factor. In this event, the vessel or vessels would of course be constructed to enable a large opening to be uncovered.

What we claim is:
1. In the generation of useful power from heterogeneous nuclear reactor plant having provision for two charges of nuclear fuel elements to be assembled into a potentially critical configuration, a method comprising the steps of controlling one assembled charge of fuel elements for maintaining therein a condition of nuclear criticality whilst concurrently controlling another assembled charge of fuel elements for maintaining therein a sub-critical condition, distributing coolant flow from a common source in proportions sufficient for the surface temperature of the fuel elements in both charges not to exceed a given maximum temperature, and subsequently changing over the respective conditions of the charges, whilst at the same time adjusting the coolant flow distribution correspondingly, whereby to enable the fuel elements of the previously critical charge to decay undisturbed until such time as discharge is desired.

2. A method according to claim 1, wherein the proportion of the coolant flow distributed to the previously critical charge is decreased progressively to maintain in such coolant flow proportion an outlet temperature substantially equal to that of the flow of the presently critical charge.

3. In the generation of useful power from heterogeneous nuclear reactor plant having provision for two charges of nuclear fuel elements to be assembled into a potentially critical configuration, a method comprising the steps of controlling one assembled charge of fuel elements for maintaining therein a condition of nuclear criticality whilst concurrently controlling another assembled charge of fuel elements for maintaining therein a sub-critical condition, distributing coolant flow from a common source in proportions sufficient for the surface temperature of the fuel elements in both charges not to exceed a given maximum temperature, and subsequently changing over the respective conditions of the charges, whilst at the same time adjusting the coolant flow distribution correspondingly, dismantling the previously critical charge, and assembling in its place a renewed charge of fresh fuel elements in readiness for another changeover of the respective conditions of the charges.

4. A method according to claim 3, wherein the dismantling includes removing the charge as a single package from the site where it was previously critical.

References Cited by the Examiner

UNITED STATES PATENTS

| | | | |
|---|---|---|---|
| 2,796,396 | 6/1957 | Szilard | 176—22 |
| 2,875,143 | 2/1959 | Froman | 176—39 |
| 2,975,118 | 3/1961 | Tognoni | 176—59 |
| 3,079,995 | 3/1963 | Natland | 176—87 |
| 3,151,029 | 11/1963 | Schwoerer | 176—28 |
| 3,181,999 | 5/1965 | Schulten | 176—39 |
| 3,194,744 | 7/1965 | Ainley et al. | 176—60 |
| 3,212,975 | 10/1965 | Fletcher et al. | 176—20 |

L. DEWAYNE RUTLEDGE, *Primary Examiner.*

LEON D. ROSDOL, *Examiner.*